(12) United States Patent
Kodama et al.

(10) Patent No.: US 8,722,572 B2
(45) Date of Patent: May 13, 2014

(54) METAL CATALYST SUBSTRATE AND ITS MANUFACTURING METHOD

(75) Inventors: Hiroshi Kodama, Saitama (JP); Kimiyoshi Nishizawa, Saitama (JP); Hiroshi Tanabe, Saitama (JP); Akio Sano, Saitama (JP); Misao Oinuma, Saitama (JP)

(73) Assignee: Calsonic Kansei Corporation, Saitama-shi (JP)

( * ) Notice: Subject to any disclaimer, the term of this patent is extended or adjusted under 35 U.S.C. 154(b) by 140 days.

(21) Appl. No.: 13/147,479

(22) PCT Filed: Jan. 12, 2010

(86) PCT No.: PCT/JP2010/050194
§ 371 (c)(1),
(2), (4) Date: Oct. 13, 2011

(87) PCT Pub. No.: WO2010/090051
PCT Pub. Date: Aug. 12, 2010

(65) Prior Publication Data
US 2012/0028797 A1 Feb. 2, 2012

(30) Foreign Application Priority Data

Feb. 3, 2009 (JP) ................................. 2009-022969
Oct. 2, 2009 (JP) ................................. 2009-230145

(51) Int. Cl.
*B01J 21/04* (2006.01)
*B01J 23/02* (2006.01)
*B01D 50/00* (2006.01)
*B01D 53/34* (2006.01)

(52) U.S. Cl.
USPC ...................... 502/439; 502/527.22; 422/180

(58) Field of Classification Search
USPC ........... 502/439, 527.19, 527.22; 55/DIG. 30; 422/180
See application file for complete search history.

(56) References Cited

U.S. PATENT DOCUMENTS

| | | | | | |
|---|---|---|---|---|---|
| 4,793,136 | A | * | 12/1988 | Whittenberger | 60/299 |
| 5,173,471 | A | * | 12/1992 | Usui et al. | 502/439 |
| 5,582,803 | A | * | 12/1996 | Yoshizaki et al. | 422/174 |
| 5,853,902 | A | * | 12/1998 | Usui | 428/593 |
| 6,040,064 | A | * | 3/2000 | Bruck et al. | 428/593 |
| 6,109,386 | A | * | 8/2000 | Maus et al. | 181/158 |
| 6,288,008 | B1 | * | 9/2001 | Matsumoto | 502/439 |

(Continued)

FOREIGN PATENT DOCUMENTS

| JP | 2000-061567 | A | | 2/2000 |
|---|---|---|---|---|
| JP | 2000061567 | A | * | 2/2000 |

(Continued)

OTHER PUBLICATIONS

Avila et al., "Monolithic reactors for environmental applications A review on preparation technologies," Chemical Engineering Journal 109 (2005) 11-36.*

*Primary Examiner* — Anthony J Zimmer
(74) *Attorney, Agent, or Firm* — Foley & Lardner LLP

(57) ABSTRACT

A metal catalyst substrate 1 is equipped with a honeycomb body 2 in which a corrugated metal foil 4 and a flat metal foil 5 are multiply rolled, their leader portions being overlapped with each other. A restricting portion 8 is formed at a core portion 7 of the honeycomb body 2 by a portion of the core portion being deformed to restrict flow of exhaust gas in a core portion 7.

15 Claims, 12 Drawing Sheets

(56) References Cited

U.S. PATENT DOCUMENTS

| | | | | |
|---|---|---|---|---|
| 6,602,477 | B2* | 8/2003 | Sakamoto et al. | 422/180 |
| 6,689,328 | B1* | 2/2004 | Otani et al. | 422/180 |
| 6,821,639 | B2* | 11/2004 | Kato | 428/593 |
| 2001/0036427 | A1* | 11/2001 | Yamada et al. | 422/179 |
| 2002/0128151 | A1* | 9/2002 | Galligan et al. | 502/302 |
| 2003/0012708 | A1* | 1/2003 | Sakamoto et al. | 422/180 |
| 2004/0009106 | A1* | 1/2004 | Galligan et al. | 422/180 |
| 2005/0163677 | A1* | 7/2005 | Galligan et al. | 422/180 |

FOREIGN PATENT DOCUMENTS

| | | | |
|---|---|---|---|
| JP | 2003-159531 A | | 6/2003 |
| JP | 2003159531 A | * | 6/2003 |
| JP | 2006-281118 A | | 10/2006 |
| JP | 2008-080214 A | | 4/2008 |
| JP | 2008080214 A | * | 4/2008 |

* cited by examiner (a)

(b)

(a)

(b)

(a)

(b)

(a)                                    (b)

METAL CATALYST SUBSTRATE AND ITS MANUFACTURING METHOD

TECHNICAL FIELD

The present invention relates to a metal catalyst substrate and a manufacturing method thereof for purifying exhaust gas and the like that are discharged from an internal combustion engine mounted on a motor vehicle.

BACKGROUND OF THE INVENTION

A patent document 1 discloses a metal catalyst substrate, in which an insert member for disturbing gas current is arranged in a core portion of a honeycomb body in order to improve the purification of the exhaust gas.

DOCUMENT ON PRIOR ART

Patent Document

Patent Document 1: Japanese Patent Application Laid-Open Publication No. 2006-281118

DISCLOSURE OF THE INVENTION

Problem(s) to be Solved by the Invention

In the metal catalyst substrate, there is a need to improve the purification performance of exhaust gas without using the insert member in order to obtain a simpler structure.

The object of the present invention is to provide a metal catalyst substrate and a manufacturing method thereof that can improve a purification performance of exhaust gas without adding a part such as an insert member.

Means for Solving the Problems

In order to accomplish the above-described object, in a metal catalyst substrate of the present invention includes a honeycomb body shaped as a circular column and an outer cylinder shaped as a circular cylinder and accommodating the honeycomb body. The honeycomb body is formed with a corrugated metal foil and flat metal foil. The corrugated metal foil and the flat metal foil are multiply rolled up, and leader portions of the corrugated metal foil and the flat metal foil are provided at a core portion of the honeycomb body. The leader portions at an end portion of the honeycomb body are deformed to expand in radial directions of the honeycomb body to form a restricting portion that decreases an opening area of the core portion so as to restrict exhaust gas from flowing through an opening of the core portion.

Effect of the Invention

Therefore, the flow amount of the exhaust gas that passes through the core portion can be restricted, and accordingly the exhaust-gas purification performance can be improved by a simpler construction without adding other parts.

DESCRIPTION OF REFERENCE NUMBERS 1 metal catalyst substrate
2 honeycomb body
4 metal foil (corrugated metal foil)
5 metal foil (flat metal foil)
7 core portion
8 restricting portion
14 jig

BEST MODE FOR CARRYING OUT THE INVENTION

Hereinafter, each embodiment that implements a metal catalyst substrate and a manufacturing method thereof of the present invention will be described.

First Embodiment

Hereinafter, a first embodiment of the present invention will be explained with reference to the accompanying drawings.

First, an entire construction of the metal catalyst substrate of the first embodiment will be described.

Figure 1:
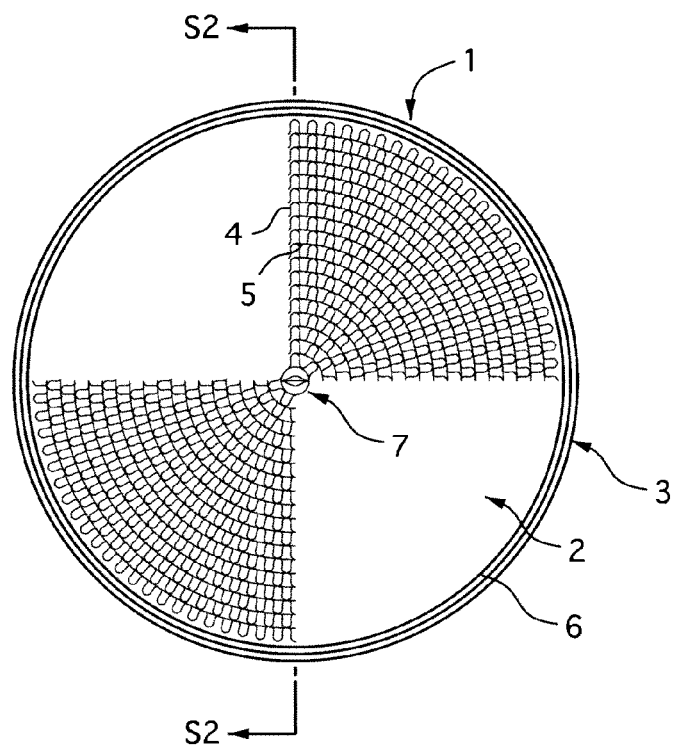
FIG. 1 is a front view showing a metal catalyst substrate of a first embodiment of the present invention.
Figure 2:
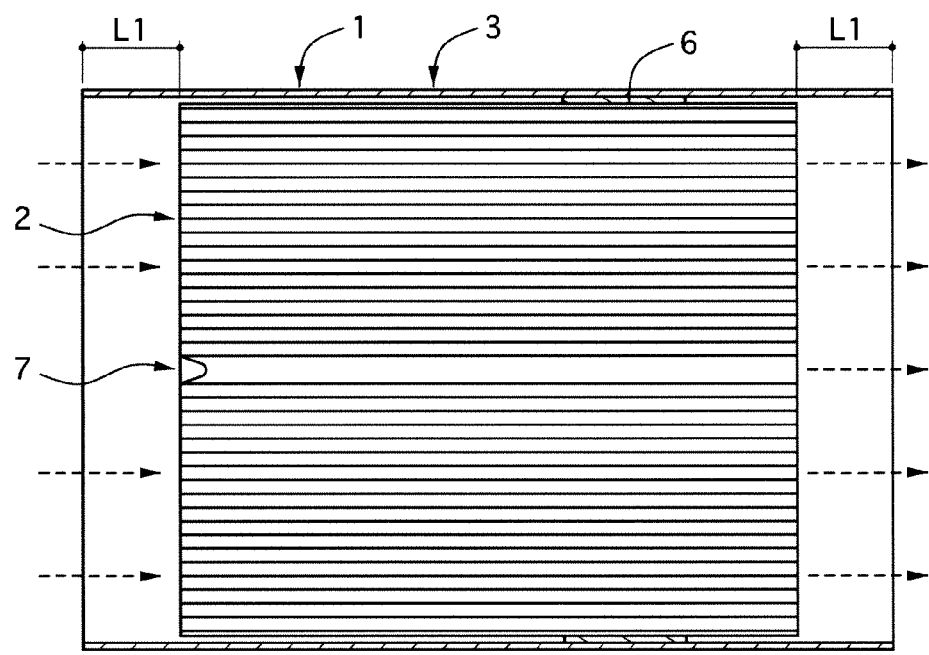
FIG. 2 is a cross sectional view taken along the line S2-S2 in FIG. 1.

As shown in FIG. 1 and FIG. 2, the metal catalyst substrate 1 of the first embodiment includes a honeycomb body 2 having an external configuration shaped like a circular column, and an outer cylinder 3 that is shaped like a circular cylinder to accommodate the honeycomb body 2 therein.

The honeycomb body 2 is obtained by multiply rolling up a corrugated metal foil 4 and a flat metal foil 5, and its entire length (the length in an axial direction) is shorter that that of the outer cylinder 3. This reason comes from that a margin can be ensured so as to weld diffusers 15 and 16 (refer to FIG. 10), which will be later described, on the both end portions in the axial direction of the outer cylinder 3.

Wave-like top portions of the metal foil 4 and the metal foil 5, which are to be jointing portions of the both metal foils 4 and 5 of the honeycomb body 2, are jointed with each other by diffusion bonding. In addition, when the honeycomb body 2 is pressed in the outer cylinder 3, brazing foil metal 6, which is preliminarily rolled on a portion near the downstream side of the outer peripheral portion of the honeycomb body 2, is melted due to heat generated in the diffusion bonding, and accordingly the honeycomb body 2 and the outer cylinder 3 are joined by brazing around the entire circumference of a portion in the axial direction thereof.

Figure 3:
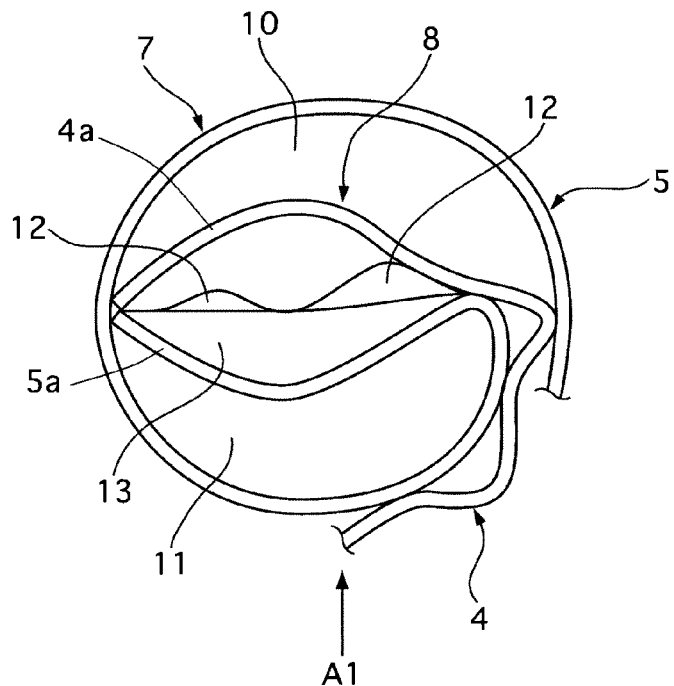
FIG. 3 is an enlarged view of a core portion of a honeycomb body of the first embodiment, and is a view showing a restricting portion.
Figure 4:
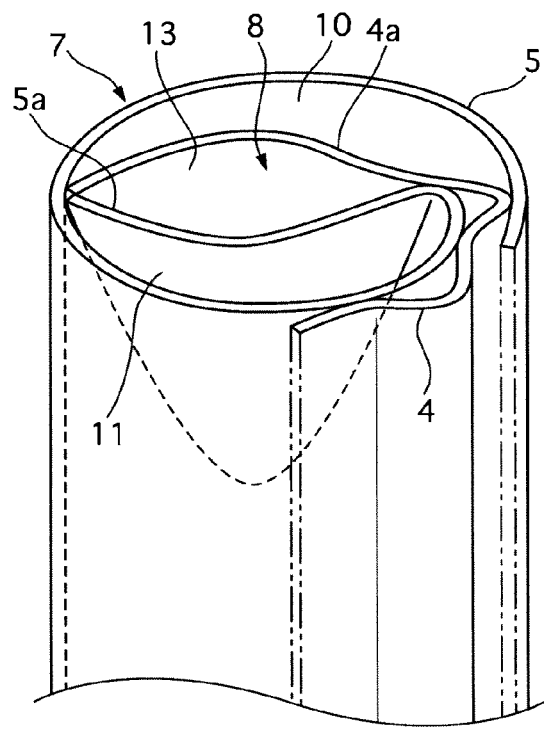
FIG. 4 is a perspective view of FIG. 3 according to a visual line indicated by an arrow A1.

Further, as shown in FIG. 3 and FIG. 4, at an exhaust-gas upstream side end portion of the core portion 7 of the both metal foils 4, 5 of the honeycomb body 2, a restricting portion 8 is provided in such a way that the leader portions 4a, 5a of the both metal foils 4, 5 are expanded toward the upstream side and in a radial direction of the honeycomb body 2 in order to restrict the flow of the exhaust gas in the core portion 7. At a downstream side end portion of the restricting portion 8, two large through-holes 10, 11 and two small through-holes 12, 12 are provided, so that they allow the exhaust gas to flow between the upstream side and the downstream side.

Next, the manufacturing method of the metal catalyst substrate 1 will be explained.

The manufacture of the metal catalyst substrate 1 of the first embodiment is carried out in the following order: "a formation process of the honeycomb body"→"a formation process of the restricting portion"→"a formation process of the outer cylinder"→"press-in process"→"heat treatment process". Incidentally, the "formation process of the honeycomb body" and the "formation process of the outer cylinder" may be carried out in parallel. Hereinafter, the details of these processes will be described.

<The Honeycomb Body Formation Process>

Figure 5:
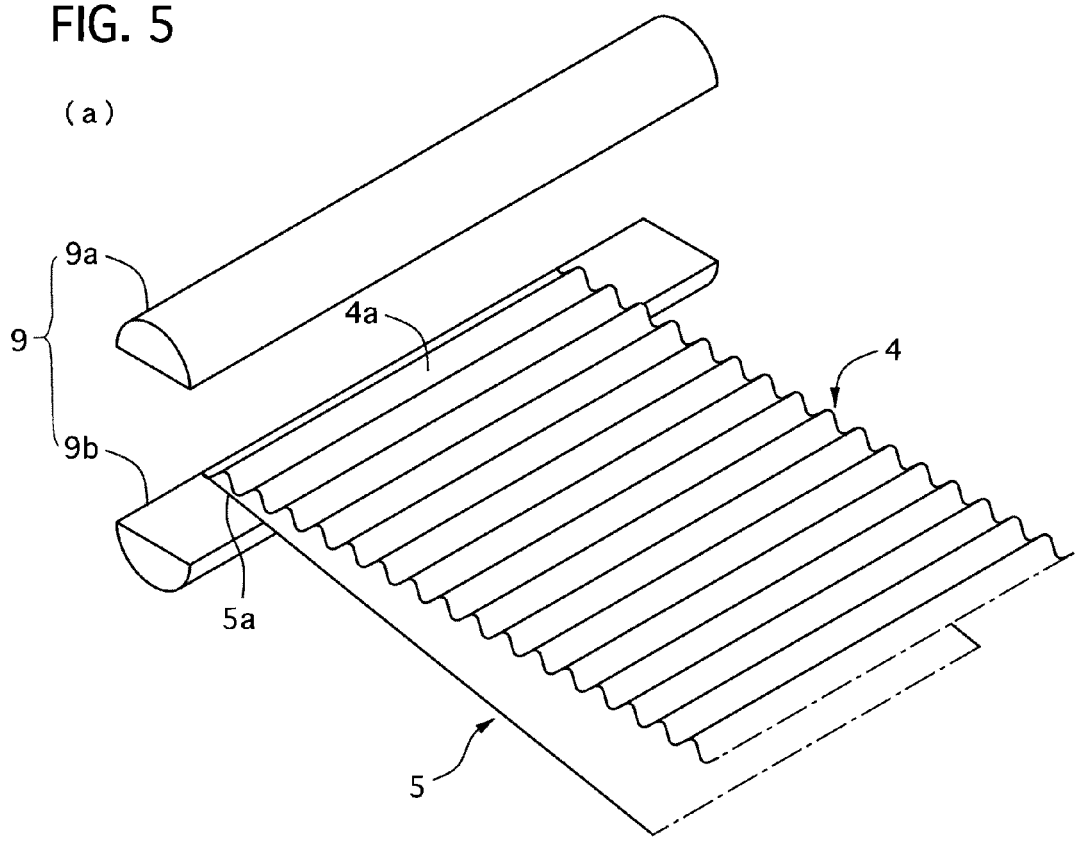
FIG. 5 is a view explaining one process of a manufacturing process of the metal catalyst substrate of the first embodiment, where (a) is a view showing a state before a pair of divided bodies sandwiches metal foils, and (b) is a view showing a state after the divided bodies sandwich the metal foils.
Figure 5:
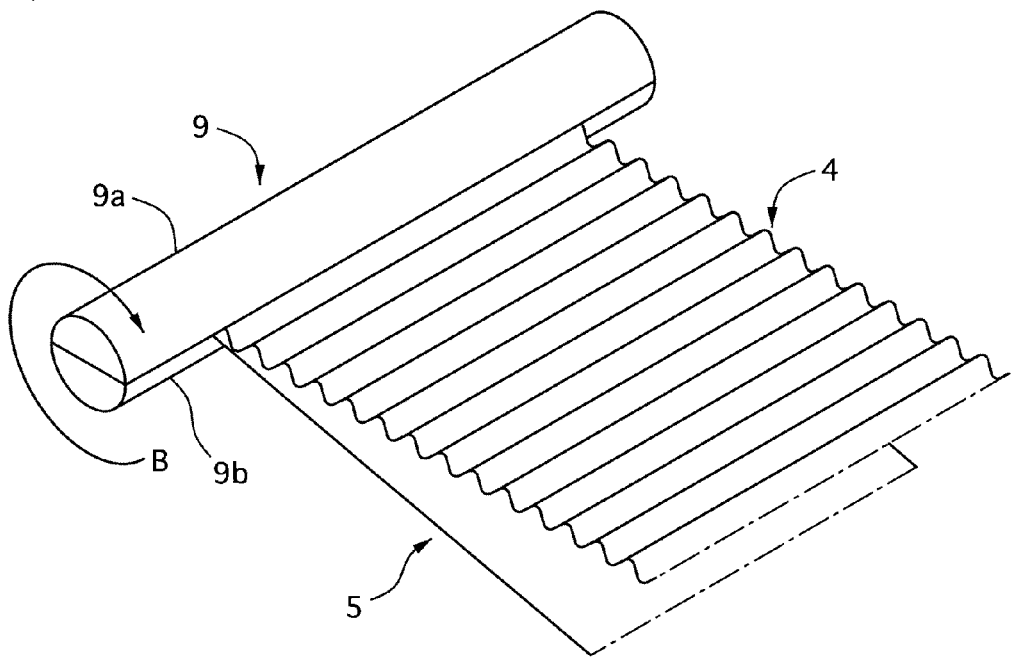

In the honeycomb body formation process, the honeycomb body 2 is formed by using a rolling device similar to that shown in Japanese Patent Application Laid-Open Publication No. 20006-239580. As shown in FIG. 5, the rolling device consists of a pair of divided bodies (split pieces) 9a, 9b shaped like a semi-circular column, where they are assembled with each other to form a rolling shaft 9 like a circular column.

In forming the honeycomb body 2, as shown in FIG. 5(a), first, the leader portion 4a of the long and corrugated metal foil 4, which is manufactured by a roll gear or the like, is overlapped with the leader portion 5a of the long and flat metal foil 5.

Subsequently, as shown in FIG. 5(b), the both metal foils 4, 5 are sandwiched in their thickness direction thereof by using the pair of the divided bodies 9a, 9b.

Next, the both axial directional end portions of the rolling shaft 9 are respectively connected to rotation shafts of the rolling device, and the rotation shafts of the rolling device drive the rolling shaft 9 in an arrow B direction in FIG. 5(b), in other words, they are multiply rolled up to form the honeycomb body 2 shaped like a roll in a state where the both metal foils 4, 5 are overlapped with each other in such away that the metal foil 5 is positioned at the outer circumferential side. After that, a brazing filler metal 6 is rolled on the outer circumference of the honeycomb body 2, and it is fixed by spot welding or the like, together with the terminated end portions of the both metal foils 4, 5.

Figure 6:
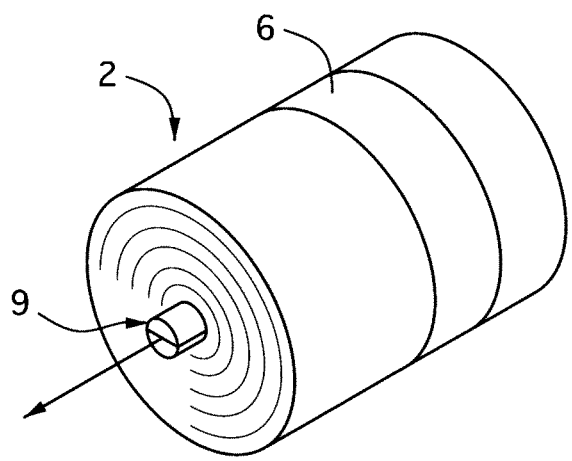
FIG. 6 is a view explaining one process in a manufacturing method of a honeycomb body of the first embodiment to explain attachment and detachment of a rolling shaft, where (a) is a view showing a state where the rolling shaft is inserted in rolled metal foils, and (b) is a view showing a state where the rolling shaft is pulled out of the metal foils.
Figure 6:
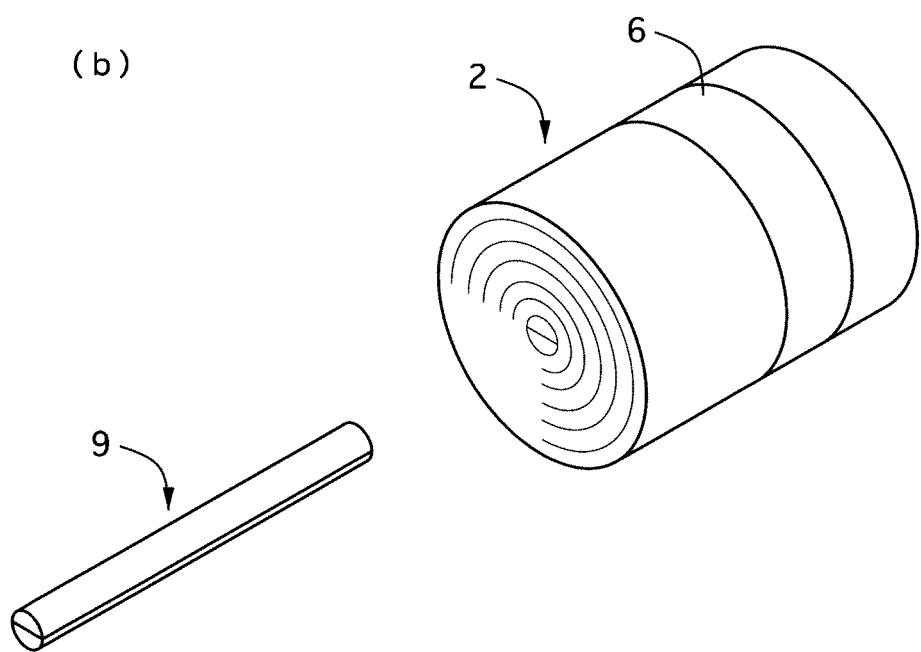
Figure 7:
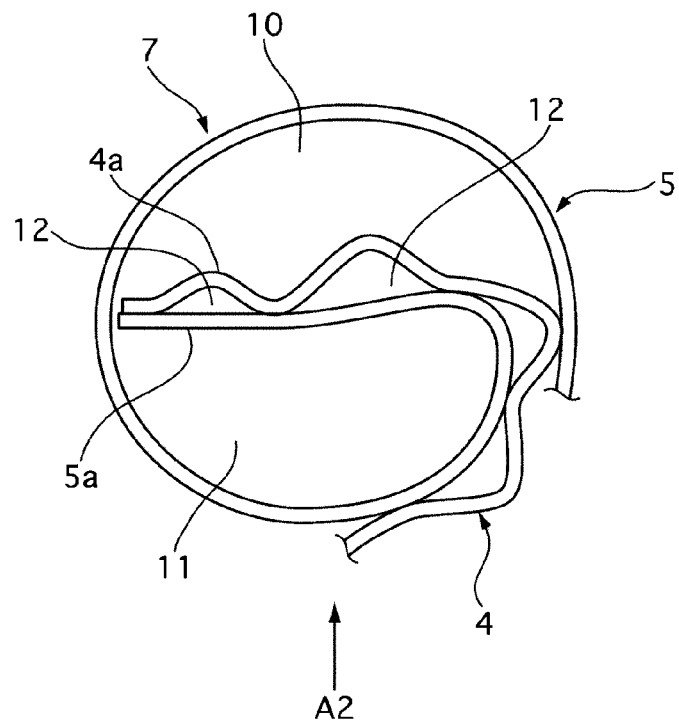
FIG. 7 is an enlarged view showing the core portion of the honeycomb body before the process where the restricting portion of the first embodiment is formed.
Figure 8:
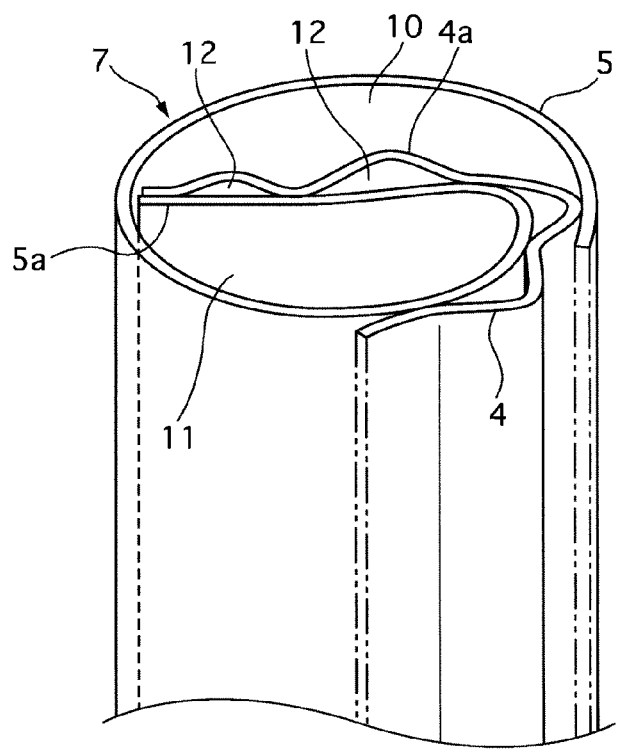
FIG. 8 is a perspective view of FIG. 7 according to a visual line indicated by an arrow A2.

Then, after the both end portions of the rolling shaft 9 are detached from the rotation shafts of the rolling device, the rolling shaft 9 is pulled out in the axial direction thereof to be detached from the honeycomb body 2 as shown in FIG. 6. At this time, as shown in FIG. 7 and FIG. 8, the two large through-holes 10, 11 are formed in the core portion 7 of the honeycomb body 2 at the both sides in the thickness direction of the leader portions 4a, 5a of the both metal foils 4, 5. In addition, the leader portion 4a of the metal foil 4 substantially recovers to be in a corrugated state because of the detachment of the rolling shaft 9. In the first embodiment, the two small through-holes 12 are formed between the metal foils 4, 5. Incidentally, the formation number, the shape and others of the through-holes 12 may be set appropriately.

<The Restriction Portion Formation Process>

Figure 9:
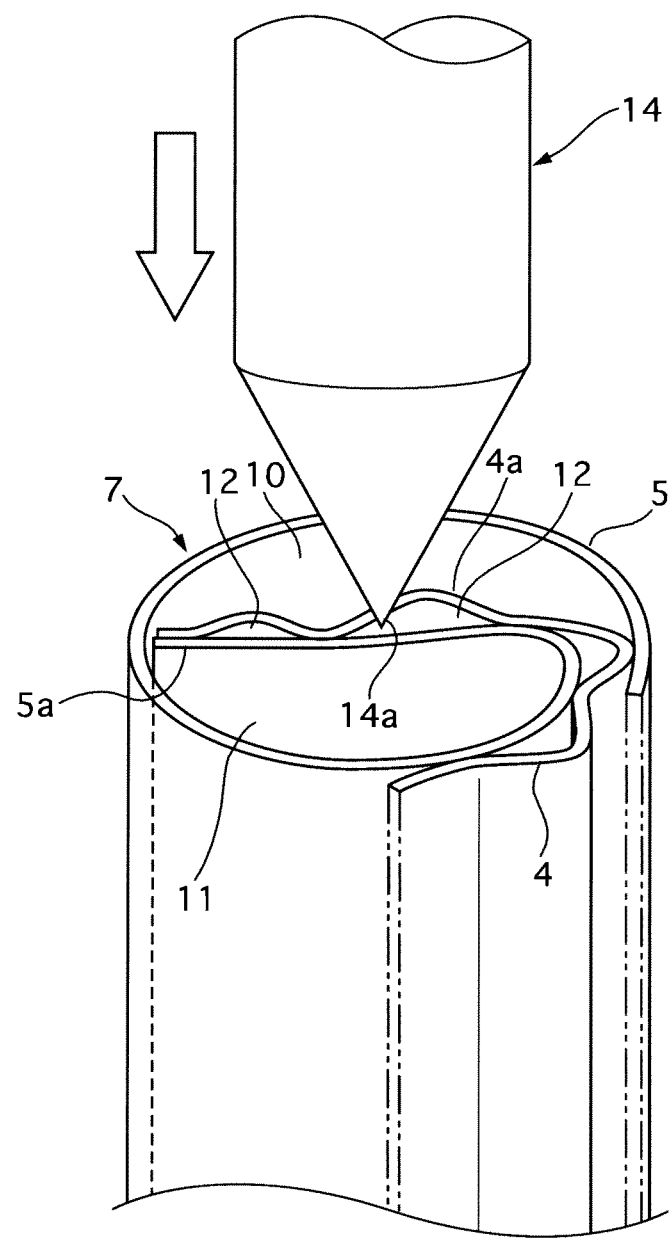
FIG. 9 is a view explaining a process for forming the restricting portion of the first embodiment.

In the restricting portion formation process, as shown in FIG. 9, a pointed tip portion 14a of a jig 14 is inserted to a certain depth in the through-holes 12 between the leader portions 4a, 5a of the both metal foils 4, 5 at an exhaust-gas upstream side end portion of the honeycomb body 2. In the first embodiment, the jig 14 is shaped like a circular cone, while the to configuration thereof may be set appropriately as long as the tip portion 14a is peaked.

The leader portions 4a, 5a of the both metal foils 4, 5 are expanded by the jig 14, and thereby the restricting portion 8 is formed to expand so as to increase its opening area between the leading portions 4a, 5a of the both metal foils 4, 5 at the exhaust-gas upstream side end portion of the honeycomb body 2 toward the upstream side as shown in FIG. 3 and FIG. 4. Consequently, the opening areas of the through-holes 10, 11 in the end surface of the exhaust-gas upstream side of the honeycomb body 2 become smaller by the amount of the opening area of the opening portion 13 of the restricting portion 8. In the first embodiment, the restricting portion 8 is formed so that the opening areas of the through-hole 10, the through-hole 11 and the opening portion 13 in the end surface become substantially equal to each other.

Herein, the thickness and the material of the both metal foils 4, 5 that constitutes the honeycomb body 2 may be set appropriately. In the first embodiment, the thicknesses of the both metal foils 4, 5 are set approximately 20 to 30 μm. In addition, the material thereof is stainless alloy including aluminum with high rigidity, and it is intended to further increase the rigidity thereof by annealing or slow quench hardening treatment. Specifically, for example, it employs ferritic stainless steel, which has good resistance to oxidation at high temperatures and to which lanthanum (La) is added, where the lanthanum has the high effect in inhibiting the growth of $Al_2O_3$ coat (aluminum coat) that grows based on chrome (Cr) and aluminum (Al) due to oxidizing at high temperature.

As examples of the ferritic stainless steel, JFE20-5USR and JFE-3USR in JFR Standard may be listed.

Similarly, the thickness and the material of the brazing foil material 6 may be set appropriately. In general, the brazing foil material 6 has the thickness substantially equal to those (approximately 20 to 30 μm) of the metal foils 4, 5, and the material thereof is nickel series brazing foil material.

<The Outer Cylinder Formation Process>

In the outer cylinder formation process, similarly to a manufacturing method of seam-welded pipes, flat raw material to be formed into the outer cylinder 3 is processed into a circular cylinder shape, and then the both end portions thereof are joined with each other by welding to obtain the desired outer cylinder 3. Incidentally, t thickness and the material of the outer cylinder 3 may be set appropriately. In the first embodiment, the thickness of the outer cylinder 3 is set approximately 1.5 mm, and the material thereof is ferritic stainless steel containing aluminum and others.

<Press-in Process>

In the press-in process, the honeycomb body 2 is accommodated in the outer cylinder 3 in a pressed state by using a press-in device similar to that described in Japanese Patent Application Laid-Open Publication No. 11-197518.

<The Heat Treatment Process>

In the heat treatment process, the outer cylinder 3 containing the honeycomb 2 is conveyed to a heating furnace under a vacuum or a heating furnace under an inert gas atmosphere, and is then heat-treated. Thereby, the top portions of a wave of the metal foil 4 and the joining portions of the metal foil 5 are thereby heated in a pressed state so as to be joined by diffusion bonding, and at the same time the outer circumferential surface of the honeycomb body 2 and the inner circumferential surface of the outer cylinder 3 are joined by brazing due to melting of the brazing foil material 6.

Incidentally, the metal catalyst substrate 1, which is taken out of the heating furnace, is then formed with a catalyst substrate layer for purifying the exhaust gas, where the layer includes precious metal, alumina and others on the surfaces of cells that pass through in the axial direction thereof and are formed by leader portions 4a, 5a of the both metal foils 4, 5 at the upstream side end portion of the honeycomb body 2.

Next, the operation of the metal catalyst substrate of the first embodiment will be described.

<The Exhaust-Gas Purification Operation of the Metal Catalyst Substrate>

The metal catalyst substrate 1, which is manufactured according to the steps of the above-explained procedure, is provided in an exhaust system of an internal combustion engine mounted on a motor vehicle.

Figure 10:
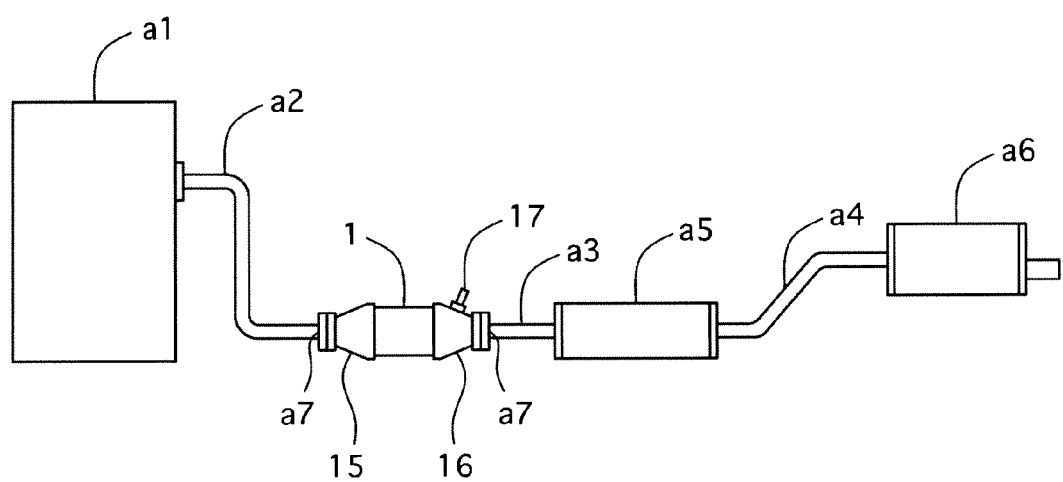
FIG. 10 is a view showing an exhaust system of the first embodiment.

For example, as shown in FIG. 10, in the exhaust system of the internal combustion engine of the motor vehicle, the not-shown exhaust ports of the engine a1 arranged at the exhaust-gas upstream side is connected to communicate with the metal catalyst substrate 1, a sub-muffler a5 and a main muffler a6 through exhaust pipes a2 to a4.

In addition, on the both end portions of the outer cylinder 3 of the metal catalyst substrate 1 are fixed by welding with one end portions of the respective diffusers 15, 16 shaped like a cylinder in a state where they are engaged from the outer side of the metal catalyst substrate 1.

Further, the other end portions, whose diameters are reduced, of the diffusers 15, 16 are fixed by welding with connecting flanges a7 to connect with the respective connecting pipes a2, a3.

Further, the diffuser 16 at the exhaust-gas downstream side is provided with a sensor 17 to detect the oxygen density of the exhaust gas.

In the above-described exhaust system of the internal combustion engine, the exhaust gas (indicated by a broken arrow in FIG. 2) that flows into the metal catalyst substrate 1 from the engine a1 passes through the cells of the honeycomb body 2, flowing on the catalyst coated on the surfaces of the corrugated metal foil 4 and the flat metal foil 5, where harmful components (HC, CO, $NO_x$ and others) in the exhaust gas are purified into harmless components ($CO_2$, $H_2O$ and others) due to the operation of the catalyst, and then it is discharged toward the sub-muffler a5 and the main muffler a6 arranged at the exhaust-gas downstream side.

<As to the Exhaust-Gas Purification Performance of the Honeycomb Body and the Detection Accuracy of the Sensor>

In the metal catalyst substrate 1 of the first embodiment, the restricting portion 8 is formed at the core portion 7 of the honeycomb body 2 to restrict the flow of the exhaust gas in the core portion 7. Therefore, the opening areas of the through-holes 10, 11 at the exhaust-gas upstream side end surface of the honeycomb body 2 become smaller relative to those formed before the restricting portion 8 is formed.

Therefore, the flow resistance of the exhaust gas in the core portion 7 can be as large as those of the other cells, or it can be blocked so as to prevent the exhaust gas from passing through. The distribution of the exhaust gas that flows in the exhaust-gas upstream side end portion of the honeycomb body 2, namely the distribution of the exhaust gas that passes through the honeycomb body 2 can become to be uniform, and it can block the exhaust gas that passes through the core portion 7 without the influence of the operation of the catalyst. Accordingly, the exhaust-gas purification performance of the honeycomb body 2 can be improved. At the same time, the exhaust-gas detection accuracy of the sensor 17 that is arranged at the exhaust-gas downstream side can be improved.

In addition, in the first embodiment, some of the exhaust gas flows in the through-holes 10, 11 to be purified, and accordingly the core portion 7 can be effectively used, and the purification performance can be improved.

Further, in the first embodiment, the exhaust gas that flows in the opening portion 13 of the restricting portion 8 passes through the through-hole 12, and accordingly a load to the restricting portion 8 due to the exhaust gas pressure can be decreased relative to that generated in a case where the restricting portion 8 is completely blocked, and thereby its durability can be improved. Further, the exhaust gas that passes through the through-holes 12 is purified, and accordingly the core portion 7 can be effectively used. Further, cinders such as unburned components in the exhaust gas can be prevented from flowing through the opening portion 13 of the restricting portion 8 and clogging therein.

<The Operation of Improvement in Durability of the Restricting Portion>

In the first embodiment, the restricting portion 8 is provided at the exhaust-gas upstream side end portion of the honeycomb body 2, and accordingly the exhaust gas can be smoothly conducted from the opening portion 13 of the restricting portion 8 to the through-holes 12 along the side wall shaped like a cone. Therefore, the load to the restricting portion 8 due to the exhaust gas pressure can be decreased. Consequently, the durability of the restricting portion 8 can be improved relative to that in a case where the restricting portion 8 is provided at the exhaust-gas downstream side end portion of the honeycomb body 2.

<The Operation of Improvement in Formability of the Restricting Portion>

In the first embodiment, the restricting portion 8 can be formed by a simple operation in such a way that the tip portion 14a of the jig 14 is inserted between the leader portions 4a, 5a of the both metal foils 4, 5. At this time, the leader portion 4a of the metal foil 4 substantially recovers to a wave-like configuration to form the through-holes 12, and accordingly the tip portion 14a of the jig 14 can be inserted between the leader portions 4a, 5a of the both metal foils 4, 5 through the through-holes 12, which provides a good insertability of the jig 14.

In addition, the restricting portion 8 has been formed before the leader portions 14a, 15a of the metal foils 4, 5 are joined with each other in the heat treatment process, and accordingly the leader portions 4a, 5a of the metal foils 4, 5 can be easily deformed.

Therefore, in the restricting portion formation process, the formability of the restricting portion 8 is good, and the both metal foils 4, 5 can be avoided from being damaged due to the insertion of the jig 14.

As explained above, the metal catalyst substrate and the manufacturing method thereof of the first embodiment can have the effects listed below.

(1) In the metal catalyst substrate 1 including the honeycomb body 2 where the corrugated metal foil 4 and the flat metal foil 5 are multiply rolled up with the leading portions thereof being overlapped with each other, the restricting portion 8 is formed at the core portion 7 of the honeycomb body 2 to restrict the flow of the exhaust gas in the core portion 7. Thereby, the flow amount of the exhaust gas that passes through the core portion 7 can be restricted, and the distribution of the exhaust gas that passes through the honeycomb body 2 can be uniform. Therefore, the purification performance of the exhaust gas can be improved without the need of additional part. As a result, the number of parts can be decreased, and thereby its manufacturing costs can be lowered.

(2) The restricting portion 8 is formed by the leader portions 4a, 5a of the metal foils 4, 5 being expanded at the axial directional end portion of the core portion 7, and accordingly the restricting portion 8 can be formed with a simple operation.

(3) The restricting portion 8 is formed at the exhaust-gas upstream side end portion of the honeycomb body 2, and accordingly the exhaust gas pressure acting on the opening portion 13 of the restricting portion 8 can be small. Therefore, the durability of the restricting portion 8 can be improved. In addition, the dynamic pressure of the exhaust gas acts on the restricting portion 8 in a direction where it is expanded, and accordingly the exhaust gas passage becomes narrower even in a case the flow amount of the exhaust gas increases, and accordingly the flow amount of the exhaust gas that passes through the core portion 7 without being purified does not increase.

(4) The through-holes 12 are provided to communicate with the restricting portion 8, penetrating in the axial direction of the honeycomb body 2, and accordingly the durability of the restricting portion 8 can be improved, the cinders such as the unburned components can be avoided from being clogged, and the core portion 7 can be effectively used.

(5) The manufacturing method of the metal catalyst substrate 1 includes the honeycomb body formation process in which the corrugated metal foil 4 and the flat metal foil 5 are multiply rolled up with the leader portions thereof being overlapped with each other, and the restricting portion formation process in which the tip portion 14a of the jig 14 is inserted between the leader portions 4a, 5a of the metal foils 4, 5 at the axial directional end portion of the core portion 7 of the honeycomb body 2. The restricting portion 8 is formed by the leader portions 4a, 5a of the both metal foils 4, 5 being expanded. Therefore, the metal catalyst substrate 1 with the restricting portion 8 can be manufactured with a simple operation such as the insertion of the jig 14 between the leader portions 4a, 5a of the both metal foils 4, 5.

(6) The method further includes the heat treatment process in which the portions to be joined of the both metal foils 4, 5 are joined by diffusion bonding after forming the restricting portion. Therefore, the formability of the restricting portion 8 and the insertability of the jig 14 can be improved.

Second Embodiment

Next, a metal catalyst substrate and a manufacturing method thereof of a second embodiment of the present invention will be explained with reference to the accompanying drawings.

First, the entire construction of the metal catalyst substrate of the second embodiment will be described.

Incidentally, in the second embodiment, the construction members similar to those of the first embodiment are indicated by the same reference number, their explanation being omitted, and only the different parts will be described.

Figure 11:
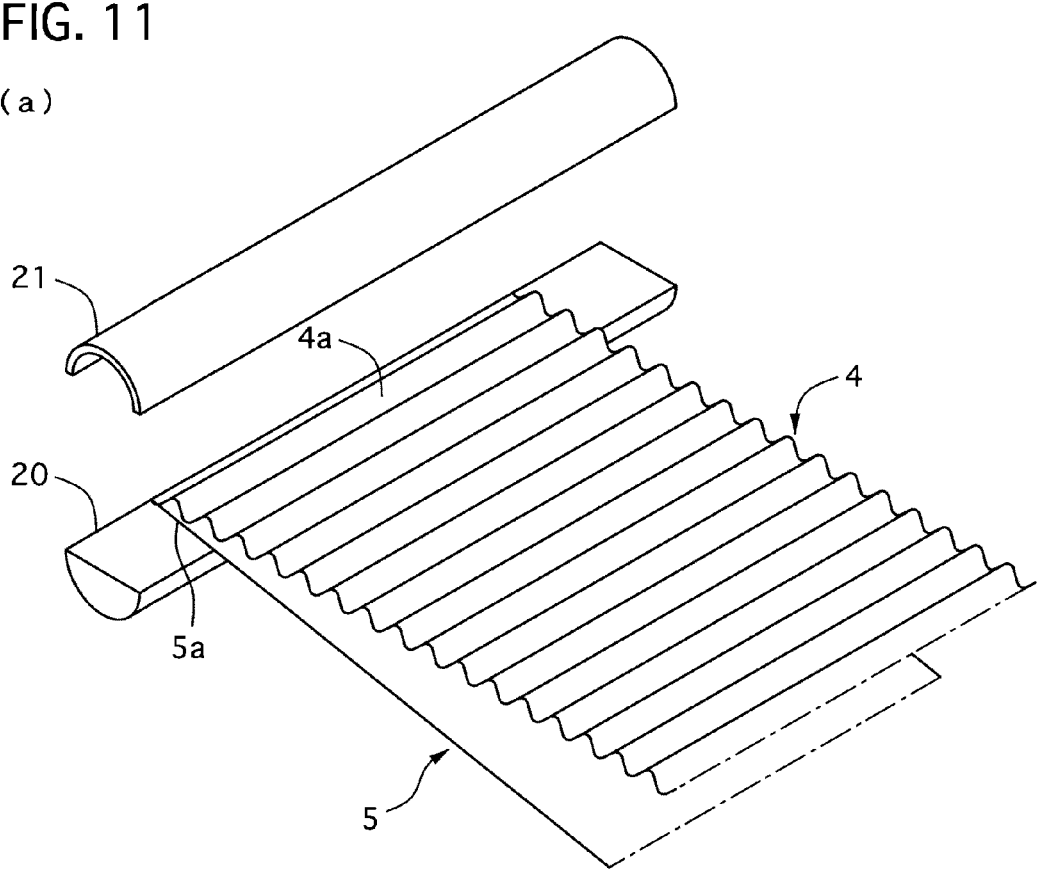
FIG. 11 is a view explaining a manufacturing method of a metal catalyst substrate of a second embodiment of the present invention to explain how to fix the both metal foils and the rolling shaft with each other, where (a) is a view showing before a pair of divided bodies sandwiches metal foils, and (b) is a view showing a state after the divided bodies sandwich the metal foils.
Figure 11:
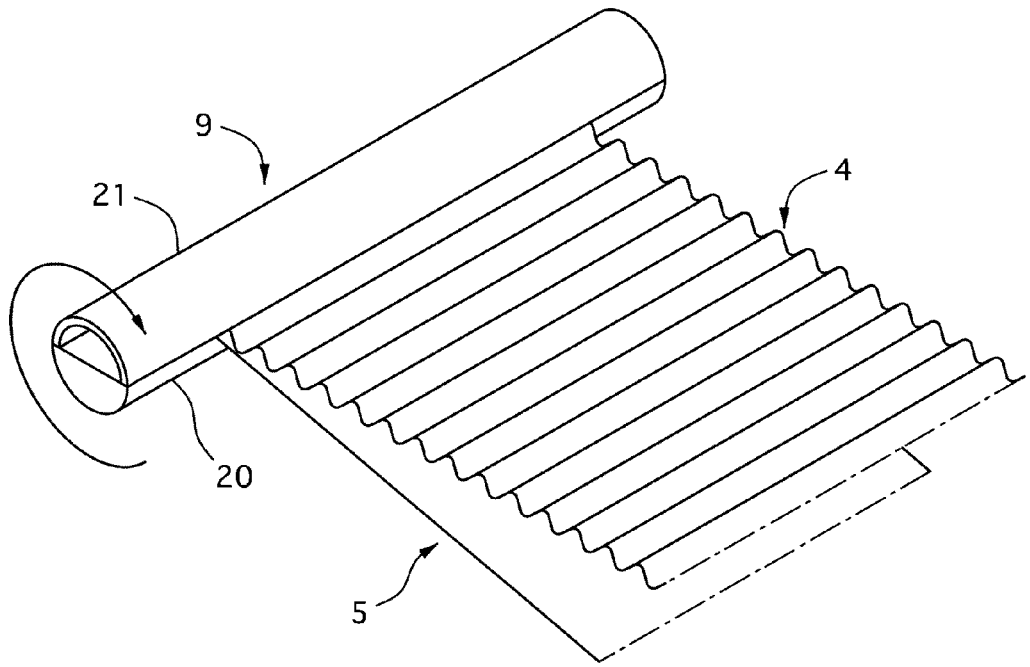

As shown in FIG. 11(a), in the second embodiment, in a honeycomb body formation process, a divided body 20 shaped like a semi-circular column and a divided body 21 shaped like a semi-circular column are employed as a rolling shaft 9 of a rolling device for the both metal foils 4, 5.

Next, the operation of the metal catalyst substrate of the second embodiment will be described.

<The Operation of Improvement in Formability of a Restricting Portion>

In the second embodiment, the wave-like configuration of a metal foil 4 does not crash because of an inner side space of the divided body 21 and its original shape can be maintained when the leader portions 4a, 5a of both metal foils 4, 5 are overlapped with each other and are sandwiched in a thickness direction by the both divided bodies 20, 21 in the honeycomb body formation process, as shown in FIG. 11(b).

Therefore, in the second embodiment, the through-holes 12, which have been described in the first embodiment, can be surely formed larger, and accordingly the insertability of a jig 14 in a restricting portion formation process can be improved. The other operation and effects are similar to those of the first embodiment, and their explanation is omitted.

Third Embodiment

Next, a metal catalyst substrate and a manufacturing method thereof of a third embodiment of the present invention will be explained with reference to the accompanying drawings.

First, the entire construction of the metal catalyst substrate of the third embodiment will be described.

Incidentally, in the third embodiment, the construction members similar to those of the first embodiment are indicated by the same reference number, their explanation being omitted, and only the different parts will be described.

Figure 12:
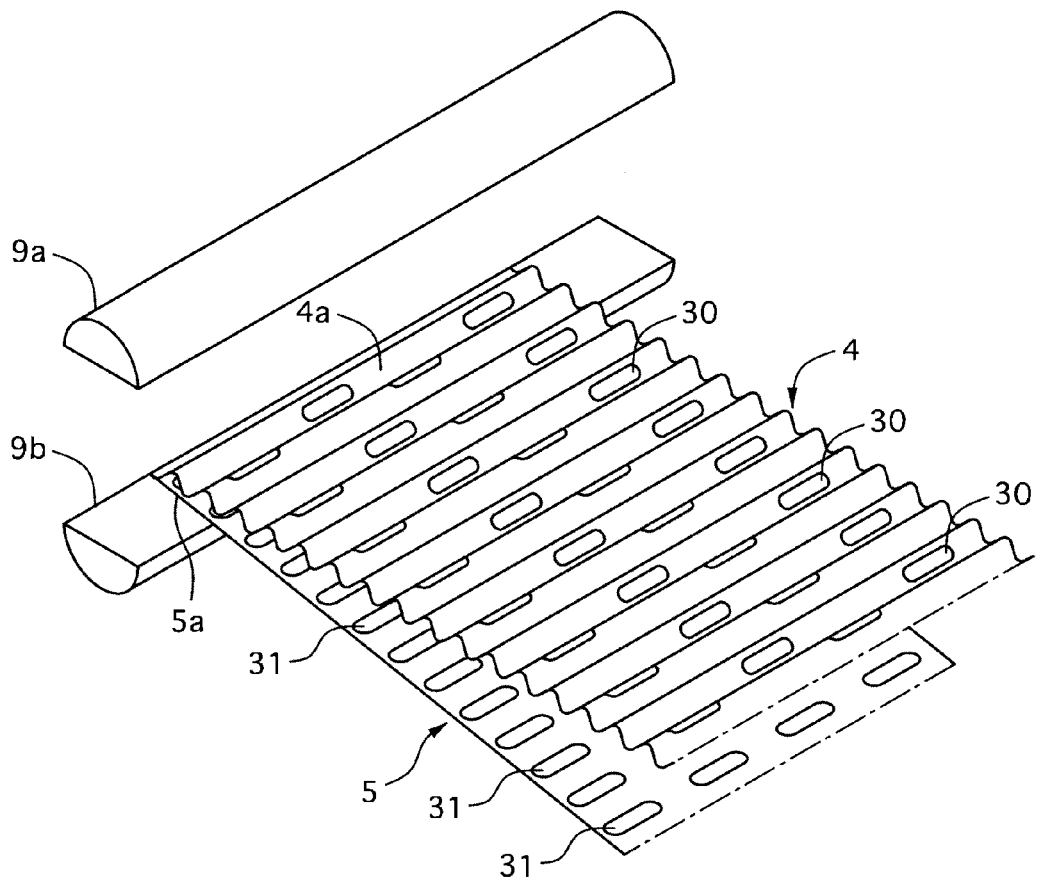
FIG. 12 is a view explaining a manufacturing method of a honeycomb body of a third embodiment of the present invention.

As shown in FIG. 12, in the third embodiment, a honeycomb body 2 is formed in such a way that both metal foils 4, 5, which have through-holes 30, 31 formed in advance to penetrate in the entire portions including at least peripheries of leader portions 4a, 5a, are rolled up. Incidentally, the formation number, the arrangements, the shapes and others of the through-holes 30, 31 may be set appropriately.

Next, the operation of the metal catalyst substrate of the third embodiment will be described.

<The Operation of Improvement in Purification of Exhaust Gas>

Figure 13:
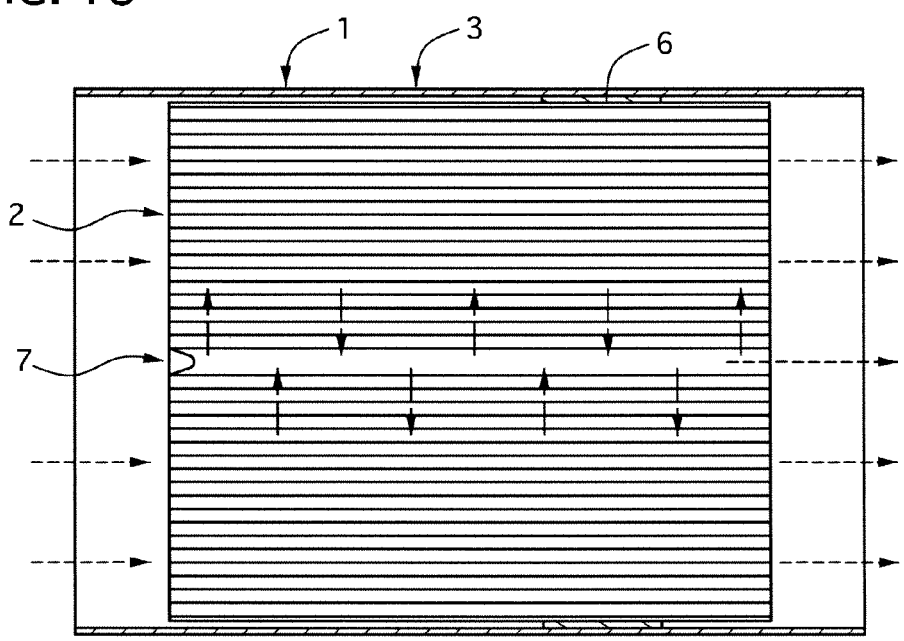
FIG. 13 is a view showing the honeycomb body of the third embodiment.

In the metal catalyst substrate 1 of the third embodiment, a part of the exhaust gas flows in a radial direction of the honeycomb body 2 through to the opening holes 30, 31, and accordingly an exhaust-gas purification performance can be improved. At this time, as shown in FIG. 13, the part of the exhaust gas that flows in the radial direction flows in the through-holes 10, 11, 12 through the opening holes 30, 31, and then it contacts with a catalyst substrate layers on circumferential walls of the through-holes 10, 11, 12 to be purified. Therefore, its exhaust-gas purification performance can be improved, and a core portion 7 can be effectively used.

Incidentally, the opening holes 30, 31 may be formed only near the leader portions 4a, 5a of the both metal foils 4, 5, and in this case the similar operation and effects can be obtained in the core portion 7.

The other operation is similar to that of the first embodiment, and its explanation is omitted.

As described above, the metal catalyst substrate and the manufacturing method thereof of the third embodiment can provide the effects listed below in addition to the effects (1) to (6) of the first embodiment.

(7) The opening holes 30, 31 are formed to penetrate in the both metal foils 4, 5 and the part of the exhaust gas flows in the radial direction of the honeycomb body 2 through the opening holes 30, 31. Therefore, the exhaust-gas purification performance of the honeycomb body 2 can be improved.

(8) The opening holes 30, 31 are formed to communicate with the through-holes 11, 12 and the part of the exhaust gas flows in the through-holes 11, 12 through the opening holes 30, 31. The part of the exhaust gas can be surely flow in the through-holes 11, 12, and accordingly the exhaust-gas purification performance can be improved, and the core portion 7 can be effectively used.

Fourth Embodiment

Next, a metal catalyst substrate and a manufacturing method thereof of a fourth embodiment of the present invention will be explained with reference to the accompanying drawings.

First, the entire construction of the metal catalyst substrate of the fourth embodiment will be described.

Incidentally, in the fourth embodiment, the construction members similar to those of the first embodiment are indicated by the same reference number, to their explanation being omitted, and only the different parts will be described.

Figure 14:
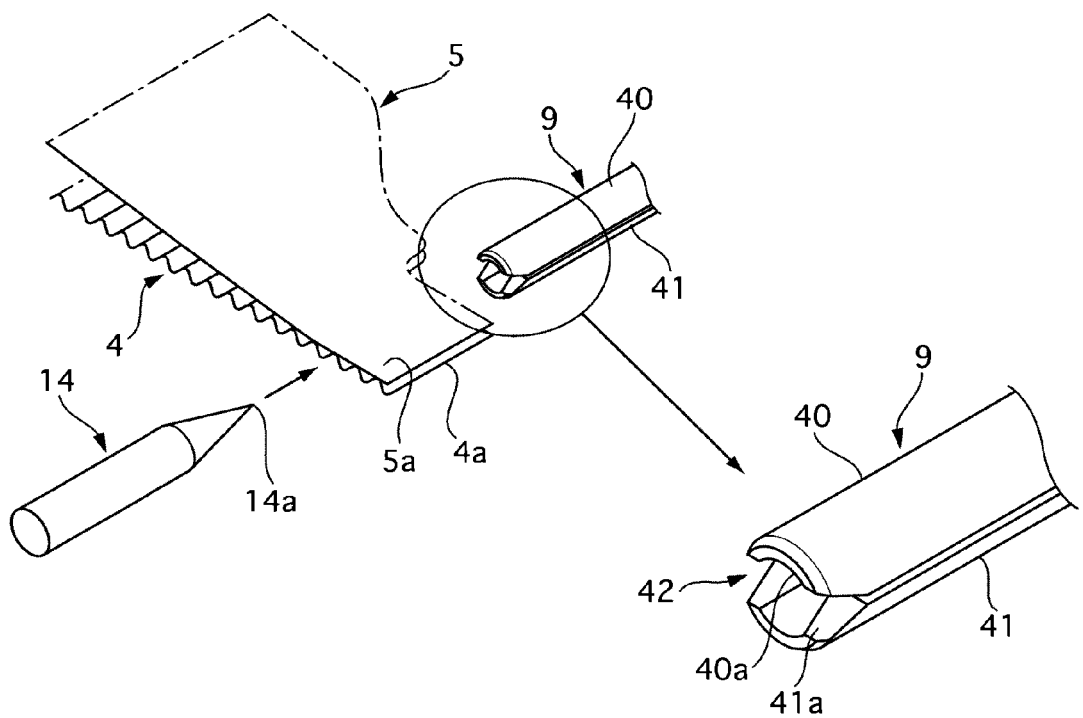
FIG. 14 is a view explaining a process for forming a honeycomb body of a fourth embodiment of the present invention.

In the fourth embodiment, in a honeycomb body formation process, divided bodies 40, 41 shaped like a semi-circular column as shown in FIG. 14 are employed as a rolling shaft 9 of a rolling device. Cut-off portions 40a, 41a are provided on the exhaust-gas upstream side end portions of the divided bodies 40, 41 to form a depressed portion 42 shaped like a cone when the divided bodies 40, 41 are assembled with each other. The depressed portion 42 is used for adjusting a configuration of a restricting portion 8 by press between the both metal foils 4, 5 and a jig 14 in a restricting portion formation process. The depressed portion 42 is formed like a shape in which a tip portion of the jig 14 is capable of being inserted, corresponding to a shape of the tip portion of the jig 14. That is, an inner circumferential shape of the depressed portion 42 is formed to substantially correspond with an outer circumferential shape of the tip portion of the jig 14.

Next, the manufacturing method of the metal catalyst substrate 1 will be described.

In the restricting portion formation process of the fourth embodiment, a first process is carried out in the middle of the honeycomb body formation process, and a second process is carried out after the honeycomb body formation process. First, in the honeycomb body formation process, when the leader portions 4a, 5a of the both metal foils 4, 5 are overlapped with each other, the tip portion of the jig 14 is inserted in the center position (rotation center position) of the rolling shaft 9 between the exhaust-gas upstream side end portions of the both metal foils 4, 5 (the first process). Herein, the insertion depth of the jig 14 is set to be the depth where the tip portion 14a does not depart from the insertion portion of the both metal foils 4, 5 when the rolling shaft 9 is driven to roll. Subsequently, as shown in FIG. 15, a pair of divided bodies 40, 41 is moved forward (moved toward the exhaust-gas upstream side of the both metal foils 4, 5) from the exhaust-gas downstream side of the both metal foils 4, 5, and the both metal foils 4 5 are sandwiched in the thickness direction by the pair of divided bodies 40, 41.

Figure 15:
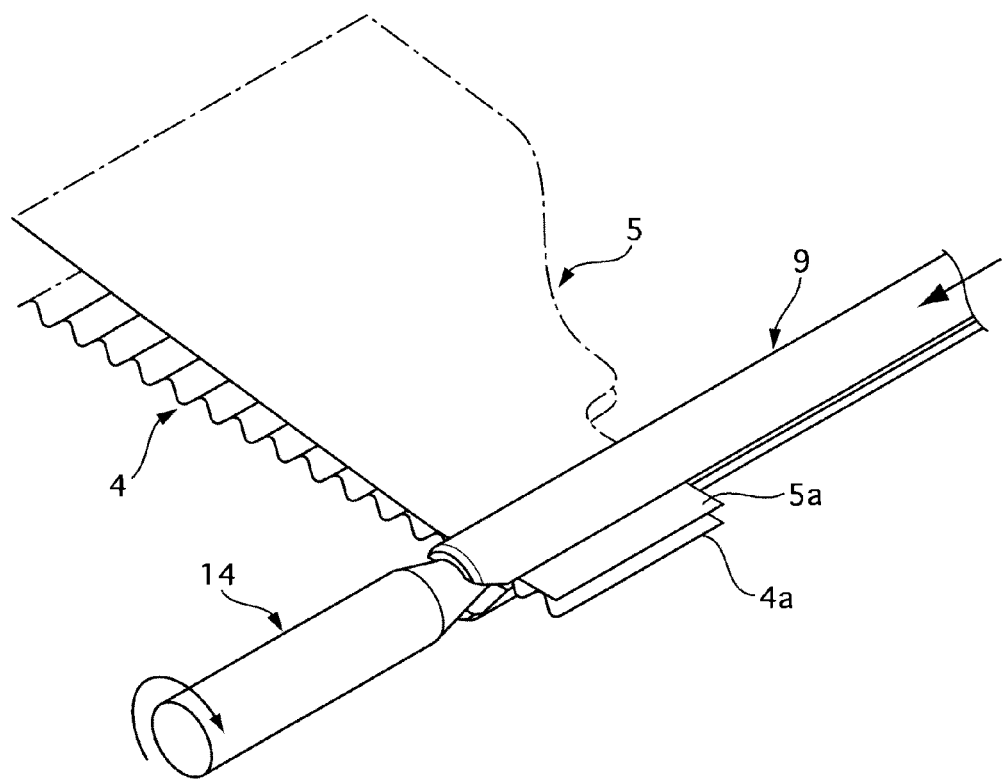
FIG. 15 is a view explaining a process for forming the honeycomb body of the fourth embodiment.
Figure 16:
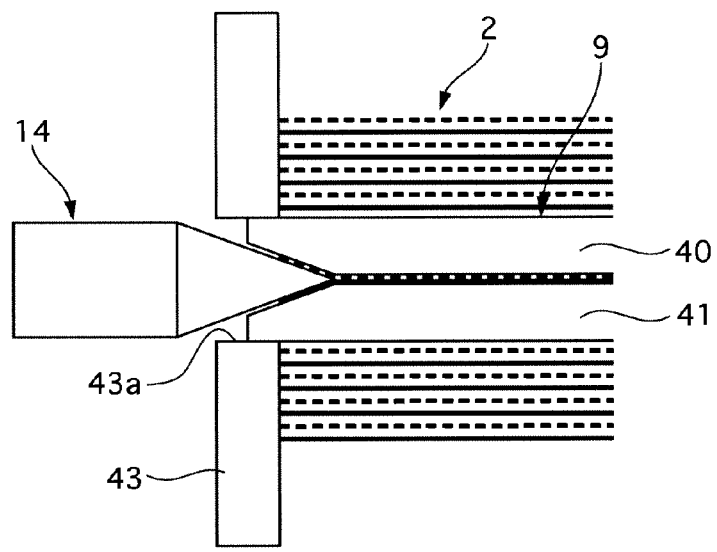
FIG. 16 is a view explaining the process for forming the honeycomb body of the fourth embodiment.

Next, as shown in FIG. 16, in a state where the end portion at the depressed portion (42) side of the rolling shaft 9 is supported by the through-hole 43a that is formed in a guide disc 43 of the rolling device and the end portion opposite to the depressed portion 42 is connected with the rotation shaft of the rolling device, the honeycomb body 2 shaped like a roll is formed by the rolling shaft 9 being driven to rotate in an arrow direction shown in FIG. 15. After the rolling is ended, the rolling shaft 9 is moved backward (moved in the arrow direction shown in FIG. 17(a)) to a certain position, and the jig 14 is pressed in the depressed portion side (the arrow direction shown in FIG. 17(a)), so that the both metal foils 4, 5 are pressed between the jig 14 and the depressed portion 42 to adjust the shape of the restricting portion 8 (the second process).

Figure 17:
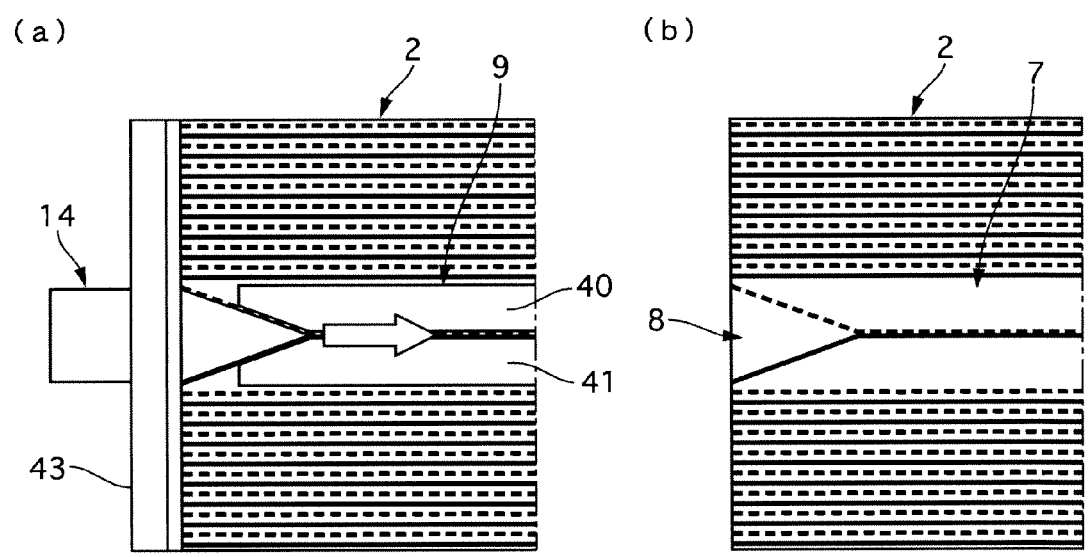
FIG. 17 is a view explaining a process for forming a restricting portion in the process for forming the honeycomb body of the fourth embodiment.

Subsequently, the one end portion of the rolling shaft 9 is departed from the rotation shaft of the rolling device, and then the rolling shaft 9 and the jig 14 are pulled out of the honeycomb body 2 to be departed therefrom. As a result, as shown in FIG. 17(b), the restricting portion 8 is formed at the exhaust-gas upstream side end portion of the core portion 7. Then the brazing foil material 6 is rolled around the outer circumference of the honeycomb body 2, and they are fixed by spot welding together with the terminal portions of the both metal foils 4, 5.

After the honeycomb body formation process, an outer cylinder formation process, a press-in process and a heat treatment process are carried out in order similarly to the first embodiment.

Next, the operation of the metal catalyst substrate of the fourth embodiment will be described.

<The Operation of Automation of the Restricting Portion Formation Process>

In the first embodiment, after the honeycomb body formation process is ended, the restricting portion 8 is formed by the jig 14 expanding the through-hole 12 (refer to FIG. 9) that is formed in the core portion 7. Herein, the wave-shape of the metal foil 4 is not uniform, so that the configuration of the through-hole 12 varies. Therefore, the position of the through-hole 12 cannot be identified by using image processing (pattern matching) based on a picked-up image of the core portion 7, so that it is difficult to automate the restricting portion formation process.

On the other hand, when it employs the method, which is different from the present invention, for forming the restricting portion 8 by the jig 14 expanding the through-holes 10, 11 that are formed in the core portion 7, to the both through-holes 10, 11 are larger in diameter than the through-hole 12, and accordingly it is easy to position the jig 14. Consequently, it is possible to automate the restricting portion formation process, while in this case it is needed to alternately form the restricting portions 8 on the both end portions of the core portion 7. For example, on the exhaust-gas upstream side end portion of the core portion 7 the restricting portion 8 needs to be formed by the through-hole 10 being expanded, while on the exhaust-gas downstream side end portion the restricting portion 8 needs to be formed by the through-hole 11 being expanded, and therefore the process increases. In addition, in a case where the both metal foils 4, 5 are provided with the opening holes 30, 31 like the third embodiment, a part of the exhaust gas that flows in the restricting portion 8 at the exhaust-gas upstream side end portion directly flows out toward the restricting portion at the exhaust-gas downstream side end portion through the through-holes 10, 11, so that it deteriorates the purification performance of the exhaust gas.

On the contrary, in the fourth embodiment, when the both metal foils 4, 5 are overlapped with each other in the honeycomb body formation process, the jig 14 is set in advance between the both metal foils 4, 5. After rolling the both metal foils 4, 5 is ended, the restricting portion 8 is formed by using the jig 14 and the depressed portion 42 of the rolling shaft 9. the position where the through-hole 12 is formed after the both metal foils 4, 5 are rolled up corresponds with the center position (shaft center) of the rotation shaft of the rolling device. In other words, in the fourth embodiment, the jig 14 is set in advance at the center position of the rotation shaft, thereby the jig 14 being surely insertable in the through-hole 12 of the core portion 7, and accordingly it is easy to automate. At this time, the jig 14 is moved only in one direction (the axial direction of the rolling shaft 9), and consequently a positioning device such as robot arm is not needed. In addition, the image processing for identifying the through-hole 12 of the core portion 7 can become unnecessary.

<The Operation of Improvement in Formability of the Restricting Portion>

In the fourth embodiment, the depressed portion 42 is adjusted by the jig 14 and the depressed portion 42 that is formed on the rolling shaft 9, so that the configuration of the restricting portion 8 can be formed more uniform relative to that obtained in a case where the restricting portion 8 is formed by using only the jig 14. Therefore, the variation (individual difference) of the exhaust-gas purification performance can be decreased. In addition, the depressed portion 42 is formed on the rolling shaft 9 that is used in the honeycomb body formation process, and accordingly there is no need to prepare an additional jig to press the restricting portion 8 together with the jig 14.

As explained above, the metal catalyst substrate and the manufacturing method thereof of the fourth embodiment can provide the effects listed below in addition to the effects (1) to (6) of the first embodiment.

(9) The restricting portion formation process includes the first process where the tip portion of the jig 14 is inserted in the shaft center position of the rolling shaft 9 between the leader end portions 4a, 5a of the both metal foils 4, 5 when the leader end portions 4a, 5a of the both metal foils 4, 5 are sandwiched between the pair of the divided bodies 40, 41 in the honeycomb body formation process, and the second process where the restricting portion 8 is formed by the jig 14 being inserted to the certain depth after the honeycomb body formation process is ended. Therefore, the jig 14 can be surely inserted in the through-hole 12 of the core portion 12, so that it is easy to automate the restricting portion formation process. In addition, it is easy to position the jig 14, so that an image processing device and robot arm for positioning can become unnecessary, thereby its manufacturing costs being suppressed.

(10) The rolling shaft 9 has the depressed portion 42 that corresponds to the shape of the tip of portion of the jig 14, and the restricting portion 8 is formed by the both metal foils 4, 5 being pressed between the jig 14 and the depressed portion 42. Therefore, the shape of the restricting portion 8 becomes uniform, and thereby the variation of the exhaust-gas purification performance can be decreased. In addition, the conventional rolling shafts 9 can be used in the restricting portion formation process.

Other Embodiments

The embodiments have been described as above, the present invention is not limited the above-described embodiments. Design changes to and the like are covered by the present inventions as long as they do not depart from the subject matter of the present invention.

For example, the shape, the size and others of detail portion of the restricting portion 8 may be set appropriately.

In addition, the metal foil 5 may employ a corrugated metal foil having a pitch larger and a height lower than those of the wave shape of the metal foil 4.

The restricting portion 8 may be formed on each of the exhaust-gas upstream and downstream side end portions of the honeycomb body 2. In this case, the passing therethrough of the exhaust gas can be avoided to more extent. In addition, the honeycomb body 2 has no direction to be assembled, and accordingly wrong assembly to the exhaust system and/or due to a direction to press into the outer cylinder 3 can be avoided. Incidentally, the restricting portion 8 may be formed only on the exhaust-gas downstream side end portion of the honeycomb body 2.

In the first to third embodiment, the restricting portion formation process may be carried out intermediately after the press-in process.

In the second embodiment, the divided body 2 is not limited to the semi-circular column, while it may be a semi-circular cylinder formed by only a necessary portion as an inner space being cut. Needless to say, the inner space may be formed at the divided body (20) side.

The sensor 17, which is attached on the diffuser 16 that is connected with the exhaust-gas downstream side of the metal catalyst substrate 1, may be a sensor to detect the temperature and the like of the exhaust gas.

Figure 18:
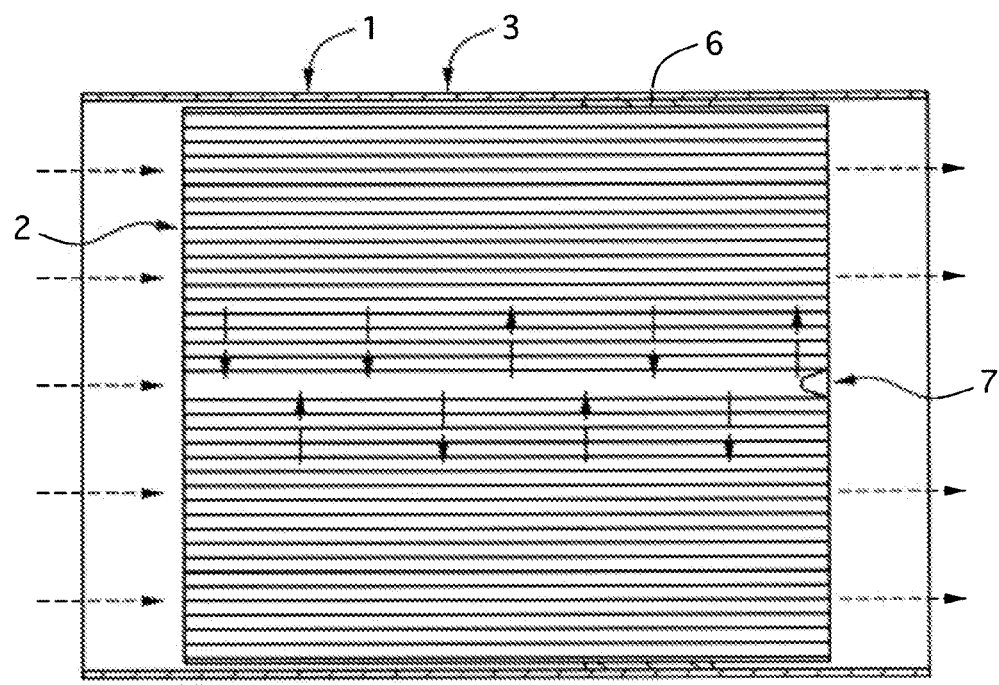
FIG. 18 is a cross sectional view showing a honeycomb body of another embodiment of the present invention.

As shown in FIG. 18, in the second embodiment, the restricting portion 8 may be formed only on the exhaust-gas downstream side end portion of the honeycomb body 2. In this case, the exhaust gas that flows in the through-holes 10 to 12 can surely flow in and out in the radial direction so that the exhaust gas is not allowed to be directly discharged toward the axial direction. Therefore, the exhaust-gas purification performance can be more surely improved.

The invention claimed is:
1. A metal catalyst substrate comprising:
a honeycomb body shaped as a circular column; and
an outer cylinder shaped as a circular cylinder and accommodating the honeycomb body,
wherein the honeycomb body is formed with a corrugated metal foil and a flat metal foil, the corrugated metal foil and the flat metal foil being rolled up multiple times,
wherein the corrugated metal foil and the flat metal foil have leader portions at a core portion of the honeycomb body, and wherein the leader portions of the metal foils are disposed at an end portion of the honeycomb body and are deformed such that the leader portions expand in radial directions of the honeycomb body so as to form a restricting portion that decreases an opening area of the core portion and thereby restricts exhaust gas from flowing through an opening of the core portion.

2. The metal catalyst substrate according to claim 1, wherein the restricting portion expands in a radial direction gradually from an intermediate portion of the honeycomb body toward an edge portion of the honeycomb body.

3. The metal catalyst substrate according to claim 2, wherein the restricting portion is formed at one of an exhaust-gas upstream side end portion and an exhaust-gas downstream side end portion of the honeycomb body.

4. The metal catalyst substrate according to claim 3, wherein a through-hole is formed at the core portion, which through-hole penetrates in an axial direction of the honeycomb body so as to communicate with the restricting portion.

5. The metal catalyst substrate according to claim 4, wherein an opening hole is formed that penetrates through the metal foils so as to permit a part of the exhaust gas to flow in a radial direction of the honeycomb body through the opening hole.

6. The metal catalyst substrate according to claim 5, wherein the opening hole is formed to communicate with the through-hole so as to permit the part of the exhaust gas to flow to the through-hole through the opening hole.

7. The metal catalyst substrate according to claim 2, wherein a through-hole is formed at the core portion, which through-hole penetrates in an axial direction of the honeycomb body so as to communicate with the restricting portion.

8. The metal catalyst substrate according to claim 2, wherein an opening hole is formed that penetrates through the metal foils so as to permit a part of the exhaust gas to flow in a radial direction of the honeycomb body through the opening hole.

9. The metal catalyst substrate according to claim 1, wherein the restricting portion is formed at one of an exhaust-gas upstream side end portion and an exhaust-gas downstream side end portion of the honeycomb body.

10. The metal catalyst substrate according to claim 9, wherein a through-hole is formed at the core portion which through-hole penetrates in an axial direction of the honeycomb body so as to communicate with the restricting portion.

11. The metal catalyst substrate according to claim 10, wherein an opening hole is formed that penetrates through the metal foils so as to permit a part of the exhaust gas to flow in a radial direction of the honeycomb body through the opening hole.

12. The metal catalyst substrate according to claim 9, wherein an opening hole is formed that penetrates through the metal foils so as to permit a part of the exhaust gas to flow in a radial direction of the honeycomb body through the opening hole.

13. The metal catalyst substrate according to claim 12, wherein the opening hole is formed to communicate with a through-hole so as to permit the part of the exhaust gas to flow to the through-hole through the opening hole.

14. The metal catalyst substrate according to claim 1, wherein an opening hole is formed that penetrates through the metal foils so as to permit a part of the exhaust gas to flow in a radial direction of the honeycomb body through the opening hole.

15. The metal catalyst substrate according to claim 14, wherein the opening hole is formed to communicate with a through-hole so as to permit the part of the exhaust gas to flow to the through-hole through the opening hole.

\* \* \* \* \*